Oct. 7, 1941.  F. HINDS  2,258,181

NUT LOCK

Filed Jan. 23, 1941

Inventor
Fred Hinds
By Clarence A. O'Brien
Attorney

Patented Oct. 7, 1941

2,258,181

UNITED STATES PATENT OFFICE 2,258,181

NUT LOCK

Fred Hinds, San Bernardino, Calif., assignor of forty-nine per cent to Henry De Armond and E. W. Martin both of Colton, and R. J. Welch, Jr., Riverside, Calif.

Application January 23, 1941, Serial No. 375,683

2 Claims. (Cl. 151—21)

This invention relates to nut locks and has for the primary object the provision of a device of this character which may be employed in of varied arts or fields of use and is especially useful in the aeroplane manufacturing field and may be readily threaded home on a bolt regardless of the length of the latter without danger of distorting the threads of either the bolt or the nut and will be self-locking and permanently locked when fully threaded home on said bolt and against the object to which the bolt is applied without damaging or marring the object and may not be unthreaded from the bolt or work loose from tight engagement with the object and eliminates the use of a separable washer on the bolt between the nut and the object.

Another object of this invention is the provision of a nut lock of the above stated character which may be manufactured economically and from any materials which may have been successfully employed in the making of nuts and bolts and may be made on an automatic screw machine to permit production cost to be kept at a minimum.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a nut in the first course or step of manufacture and in accordance with the present invention.

Figure 1:
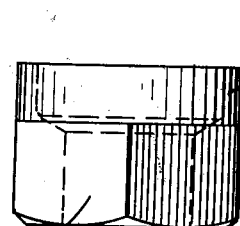
Figure 2:
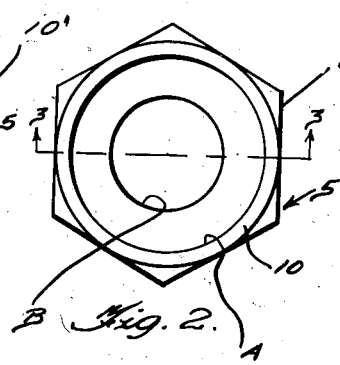
Figure 2 is an end view illustrating the same.
Figure 3:
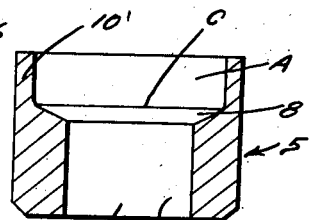
Figure 3 is a sectional view taken on the line 3—3 of Figure 2.
Figure 4:
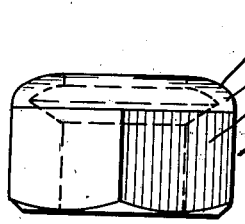
Figure 4 is a side elevation illustrating the nut at another stage of manufacture.
Figure 5:
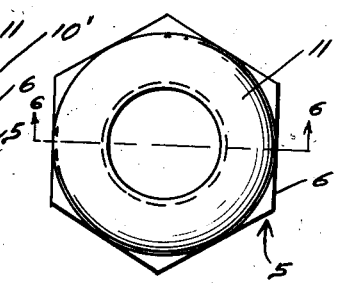
Figure 5 is an end view illustrating the same.

Referring in detail to the drawing, the numeral 5 indicates the body of the nut, the external shape of which may be in accordance with the varied designs of nuts now in use having the usual wrench-engaging faces 6. The bore of the body is indicated by the character 7 and by referring to Figure 3 it will be seen that this bore has different size diameters A and B presenting in the bore of the body a beveled shoulder 8. The portion B of the bore 7 is screw threaded, as shown at 9, the threads extending from the shoulder 8 to one end of the body. These threads are adapted to match the threads of a bolt 10.

The forming of the bore 7 with the portions A and B as specified presents a flange-like portion or collar 10 extending from the shoulder 8 to one end of the body, the thickness of the walls thereof being much less than the thickness of the walls of the major portion of the body or that part between the shoulder 8 and the other end of the body from the flange or collar 10. The formation of the bore 7 in the body can be easily carried out by a boring operation and after the formation of the bore as specified to present the flange 10' the latter is rolled inwardly presenting a convex outer face 11 to contact the object to which the bolt 10 is applied and the edges of the flange 10' are provided with screw threads 12 matching the threads 9 as well as the threads of the bolt.

Figure 6:
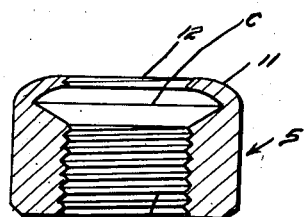
Figure 6 is a sectional view taken on the line 6—6 of Figure 5.
Figure 7:
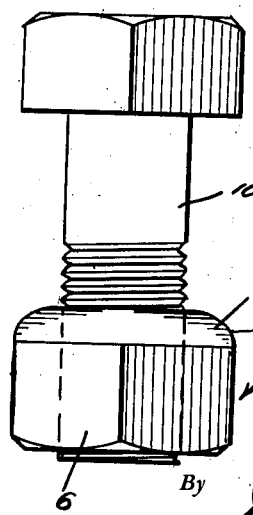
Figure 7 is a plan view illustrating the nut applied to a bolt, the nut being constructed in accordance with the present invention.

When the flange 10' has been rolled as specified it assumes the form or shape as shown in Figure 6 so that said flange will provide a washer-like lock collar integral with the nut and is adapted to advance on the bolt ahead of the body proper of the nut when the latter is threaded on the bolt and when the convex face 11 thereof comes in tight contact with the object the advance of the flange on the bolt discontinues and further threading of the nut on the bolt causes the major portion of the nut to advance toward the flange and bring about a self-locking of the nut on the bolt. This self-locking of the nut on the bolt as explained will bring about a permanent locking of the nut on the bolt and against the object so that any danger of the nut working loose on the bolt will be entirely eliminated.

During the application of the nut on the bolt and against the object as heretofore described and when the flange 10' becomes engaged with the object and non-movable endwise on the bolt, the major portion of the nut still advancing toward the object on the bolt will bring about bending of the material on the line C so that the major portion of the nut moves closer to that portion of the flange bearing the threads 12 as to establish a self-locking and permanent locking of the nut on the bolt and tightly against the object.

While I have shown and described the preferred embodiment of my invention, it will be understood that minor changes in construction, combination and arrangement of parts may be made without departing from the spirit and scope of the invention as claimed.

Having thus described my invention, what I claim is:

1. A self-locking nut comprising an internally threaded body having a tool-engageable face, a thin-walled, continuous, annular lock collar integral with the body at its work end and having a substantially convex work face, said lock collar being bored and threaded in conformity with the nut bore, and the inner face of the collar meeting the nut body at an acute angle of which the apex lies in a plane perpendicular to the nut axis and spaced axially outward beyond the work end of the tool-engageable face to provide a line on which only that part of the collar outwardly of the line bends radially and axially inward on work engagement of the nut.

2. A self-locking nut comprising an internally threaded body having a plurality of flat side faces terminating at the work engaging end in a plane perpendicular to the nut axis, a thin-walled, substantially frusto-conical, continuous, annular lock collar integral with the body at its work end, the base of said lock collar occupying a plane common to the terminal plane of said flat faces proximate the periphery of the nut, the apex of said lock collar being bored and threaded in conformity with the nut bore, and the inner face of the collar forming with the nut body an acute angle of which the apex lies in a plane parallel to and spaced axially outward from the base plane of the collar to provide an annular bend line on which the lock collar bends radially and axially inward on work engagement of the nut.

FRED HINDS.